(12) United States Patent
Caron

(10) Patent No.: US 9,361,808 B1
(45) Date of Patent: Jun. 7, 2016

(54) TRACKING SYSTEM

(71) Applicant: CAE INC., Saint-Laurent (CA)

(72) Inventor: Francois Caron, Laval, CA (US)

(73) Assignee: CAE Inc., Saint-Laurent, Quebec (CA)

( * ) Notice: Subject to any disclaimer, the term of this patent is extended or adjusted under 35 U.S.C. 154(b) by 0 days.

(21) Appl. No.: 14/673,352

(22) Filed: Mar. 30, 2015

(51) Int. Cl.
| | | |
|---|---|---|
| G09B 23/28 | (2006.01) | |
| G09B 23/30 | (2006.01) | |
| G09B 5/02 | (2006.01) | |

(52) U.S. Cl.
CPC ............... *G09B 23/285* (2013.01); *G09B 5/02* (2013.01); *G09B 23/30* (2013.01)

(58) Field of Classification Search
CPC ...... G09B 23/30; G09B 23/28; G09B 23/285; G09B 23/288; G09B 23/286; G09B 23/306; G09B 23/34; G09B 5/00; G09B 7/00; G09B 9/00; G06F 19/3437
USPC ................................................ 434/272, 267
See application file for complete search history.

(56) References Cited

U.S. PATENT DOCUMENTS

| | | |
|---|---|---|
| 8,480,406 B2 | 7/2013 | Alexander et al. |
| 2003/0091967 A1* | 5/2003 | Chosack et al. ............. 434/262 |
| 2005/0008997 A1 | 1/2005 | Herman |
| 2007/0043285 A1* | 2/2007 | Schwartz ........... A61B 18/1492 600/407 |
| 2011/0212426 A1* | 9/2011 | Gloeggler et al. ............. 434/262 |
| 2012/0078236 A1* | 3/2012 | Schoepp ........................ 606/1 |
| 2012/0082969 A1* | 4/2012 | Schwartz ............ G09B 23/285 434/262 |

* cited by examiner

*Primary Examiner* — Xuan Thai
*Assistant Examiner* — Robert P Bullington

(57) ABSTRACT

The present simulated medical instrument is adapted for insertion in a channel of a body cavity simulator. The present simulated medical instrument comprises a tube and at least one tracking device. The tube comprises a proximal end and a distal end. The tube is sized and shaped for insertion in the channel of the body cavity simulator. The at least one tracking device is located in proximity of the distal end of the tube, the tracking device having a pattern detectable via camera.

16 Claims, 21 Drawing Sheets

TRACKING SYSTEM

TECHNICAL FIELD

The present disclosure relates to the field of medical simulation. More specifically, the present disclosure relates to a tracking system.

BACKGROUND

Medical simulations are used to practice complex medical procedures, for the purposes of training medical staff, rehearsing a particular medical procedure in a simulation environment before performing it on a real patient, etc.

A specific type of complex medical procedure consists in inserting a medical instrument (e.g. a guide wire, a catheter, a cannula, etc.) inside a body channel (e.g. in a trachea while performing a tracheotomy, in a channel of the intestine such as the large intestine or the small intestine while performing an intervention on the digestion system, etc.). The intervention may involve insertion of a single medical instrument in the channel. Alternatively, a more complex intervention may involve insertion of a plurality of medical instruments in the channel (e.g. a guide wire inserted inside a catheter inserted inside a cannula inserted inside the channel).

Devices for simulating medical procedures involving mock medical instruments have been developed for practicing the medical procedures without interfering with a real patient. The device simulates a particular body region, for instance a body cavity comprising a channel, and allows insertion of the mock medical instrument(s) inside the simulated body region. Some of these devices further include a dedicated mechanism for tracking the progress of the mock medical instrument(s) inside the simulated body region.

However, such devices are usually bulky, and their size reduces their mobility. There is therefore a need for a new tracking system.

SUMMARY

According to a first aspect, the present disclosure is directed to a simulated medical instrument for insertion in a channel of a body cavity simulator. The simulated medical instrument comprises a tube and at least one tracking device. The tube comprises a proximal end and a distal end, and is sized and shaped for insertion in the channel of the body cavity simulator. The at least one tracking device is located in proximity of the distal end of the tube and has a pattern detectable via camera.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to medical simulation.

Reference is now made concurrently to FIGS. 1A, 1B, 1C, 2, 3A, 3B 3C, and 4, which represent a simulated medical instrument 100 for insertion in a channel of a body cavity simulator, according to a first aspect of the present disclosure.

Figure 1A:
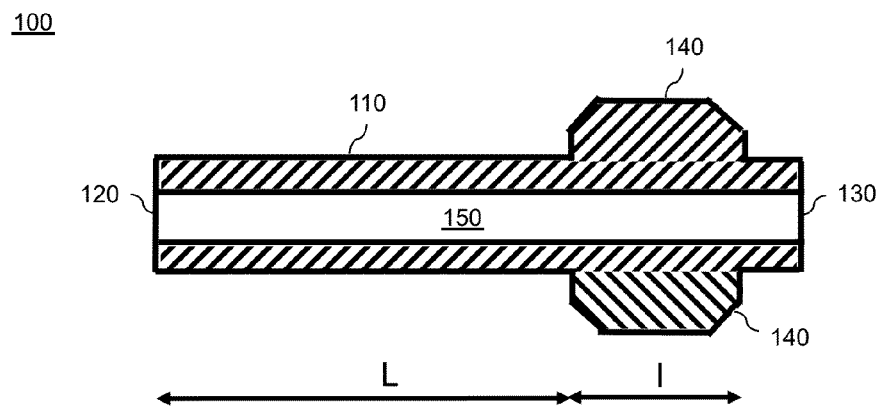
FIG. 1A illustrates a side cross-sectional view of a simulated medical instrument, according to a first embodiment.
Figure 1B:
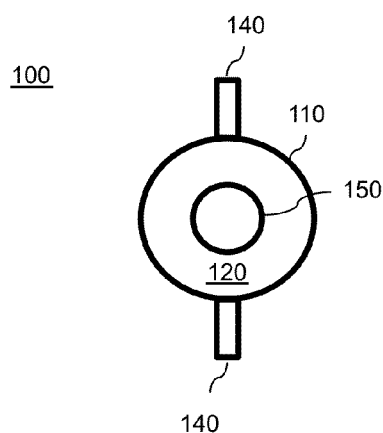
FIG. 1B illustrates a front view of the simulated medical instrument of FIG. 1A.
Figure 1C:
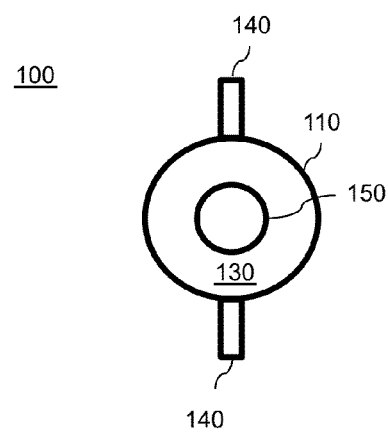
FIG. 1C illustrates a rear view of the simulated medical instrument of FIG. 1A.

FIGS. 1A, 1B and 1C represent a first embodiment of the simulated medical instrument 100, where FIG. 1A is a side cross-sectional view, FIG. 1B is a front view and FIG. 1C is a rear view.

The simulated medical instrument 100 comprises a tube 110. The tube 110 has a proximal end 120 and a distal end

130. The tube 110 is sized and shaped for insertion in a channel of a body cavity simulator, which will be described later in the description. The tube 110 illustrated in FIGS. 1A, 1B and 1C has a cylindrical shape, but may have another shape based on the type of medical instrument simulated. Furthermore, the length and diameter of the tube 110 also varies based on the type of medical instrument simulated. The tube 110 can be made in various materials, but is preferably made of a flexible material, for allowing insertion in a channel of a body cavity simulator which does not have a linear shape, as will be illustrated later in the description.

The simulated medical instrument 100 comprises at least one tracking device 140 located in proximity of the distal end 130 of the tube 110. In FIGS. 1A, 1B and 1C, two tracking devices 140 have been represented for illustration purposes. The two tracking devices 140 are aligned with one another and define a 180 degree angle between them. However, any number of tracking devices 140 may be present, which may be aligned or not with one another, and define various angles between themselves. For instance, the simulated medical instrument 100 can also have a single tracking device 140, three tracking devices 140 aligned with one another and defining a 120 degree angle between them, four tracking devices 140 aligned with one another and defining a 90 degree angle between them, etc. Furthermore, the tracking devices 140 of a particular simulated medical instrument 100 can all have a similar shape, or may have different shapes.

The length L of the tube 110 illustrated in FIG. 1A is not meant to be limitative in terms of a ratio between the length L of the tube 110 and the length l of the tracking devices 140. The tube 110 has been represented with a relatively short length L for simplification purposes. However, the tube 110 may have any length that represents a realistic intervention (e.g. one meter). With respect to a diameter of the tube 110, it depends on the type of medical instrument being simulated (e.g. catheters of various diameters), and varies accordingly.

Figure 2:
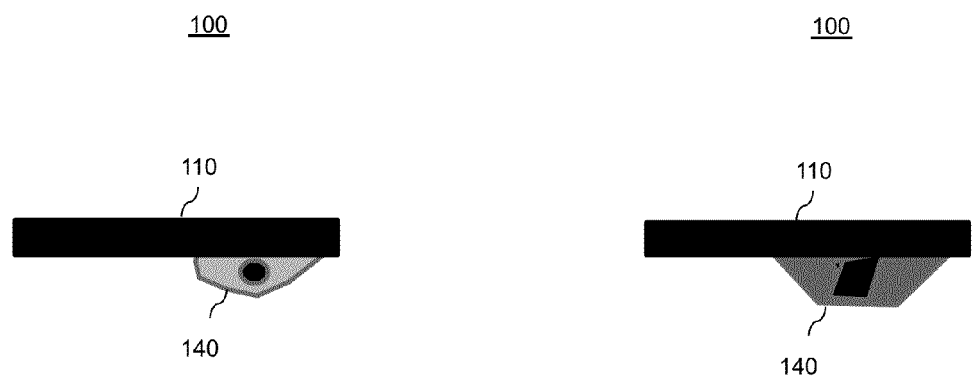
FIG. 2 represents two instances of the simulated medical instrument of FIG. 1A having a tracking device with a particular combination of shape and color pattern.

Each tracking device 140 has a pattern detectable via camera. The pattern may consist of a specific shape, a specific color pattern, a combination of a specific shape and a specific color pattern, etc. The specific color pattern can be a different uniform color for each tracking device 140, or a combination of colors forming a different color pattern for each tracking device 140. FIG. 2 represents two simulated medical instruments 100 with a single tracking device 140, each tracking device 140 having a combination of shape and color pattern different from the other tracking device 140. In a particular embodiment, the tracking device 140 projects radially away from the tube 110 along an external surface of the tube 110. For example, the tracking device is a flag, etc. In another particular embodiment, the tracking device 140 is a marking on the tube 110. For example, the tracking device consists of a tag, a line, a barcode, etc. The tracking device 140 may be removably secured to the tube 110 (e.g. glued to a surface of the tube 110, inserted in a securing mechanism of the tube 100 such as a notch, etc.). Alternatively, it is integral to the tube 110.

FIGS. 1A, 1B and 1C represent a first embodiment of the simulated medical instrument 100, where the tube 110 comprises an inner longitudinal passage 150 extending between the proximal end 120 and the distal end 130, for receiving another simulated medical instrument in the inner longitudinal passage 150. The passage 150 illustrated in FIGS. 1A, 1B and 1C has a cylindrical shape (generally circular cross-section), but may have another shape (e.g. generally elliptical cross-section) based on the type of medical instrument simulated. Furthermore, the diameter of the passage 150 also varies based on the type of medical instrument simulated. Although the passage 150 illustrated in FIGS. 1A, 1B and 1C is centered within the tube 110, it may also not be centered. Additionally, the tube 110 may include more than one passage 150. In this first embodiment, the simulated medical instrument 100 can simulate a cannula, a catheter, a catheter equipped with a balloon, etc.

The tube 110 may be at least partially made of a transparent, semi-transparent or translucent material for allowing detection by a camera of a pattern of a tracking device 140 of another simulated medical instrument 100 inserted inside the tube 110.

The simulated medical instrument 100 replicates a real medical instrument (e.g. a real cannula or a real catheter), but includes the tracking device(s) for detection purposes. However, real medical instruments could also be used, but need to be adapted to include the tracking device(s) 140.

Figure 3A:
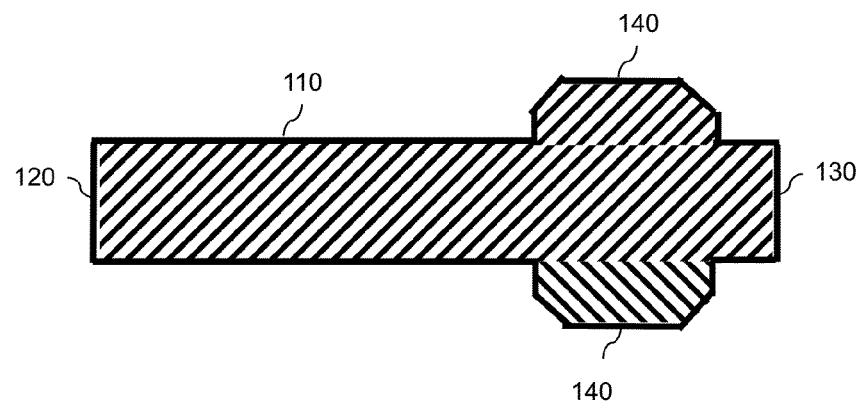
FIG. 3A illustrates a side cross-sectional view of a simulated medical instrument, according to a second embodiment.
Figure 3B:
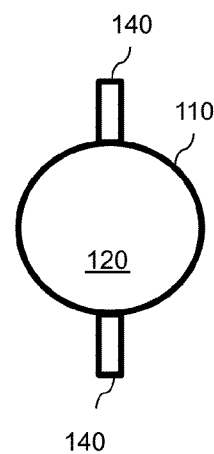
FIG. 3B illustrates a front view of the simulated medical instrument of FIG. 3A.
Figure 3C:
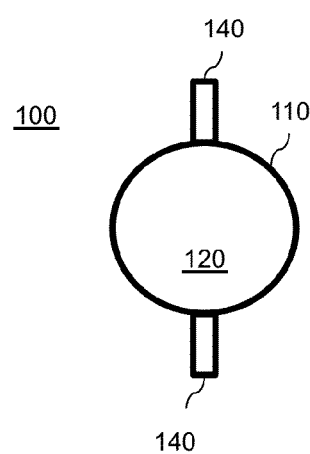
FIG. 3C illustrates a rear view of the simulated medical instrument of FIG. 3A.

FIGS. 3A, 3B and 3C represent a second embodiment of the simulated medical instrument 100, where FIG. 3A is a side cross-sectional view, FIG. 3B is a front view and FIG. 3C is a rear view.

This second embodiment is similar to the first embodiment represented in FIGS. 1A, 1B and 1C, except that the tube 110 is solid between the proximal end 120 and the distal end 130 (does not comprise an inner longitudinal passage). Consequently, it does not allow insertion of another simulated medical instrument in a passage. In this second embodiment, the simulated medical instrument 100 can simulate a guiding wire, etc.

Figure 4:
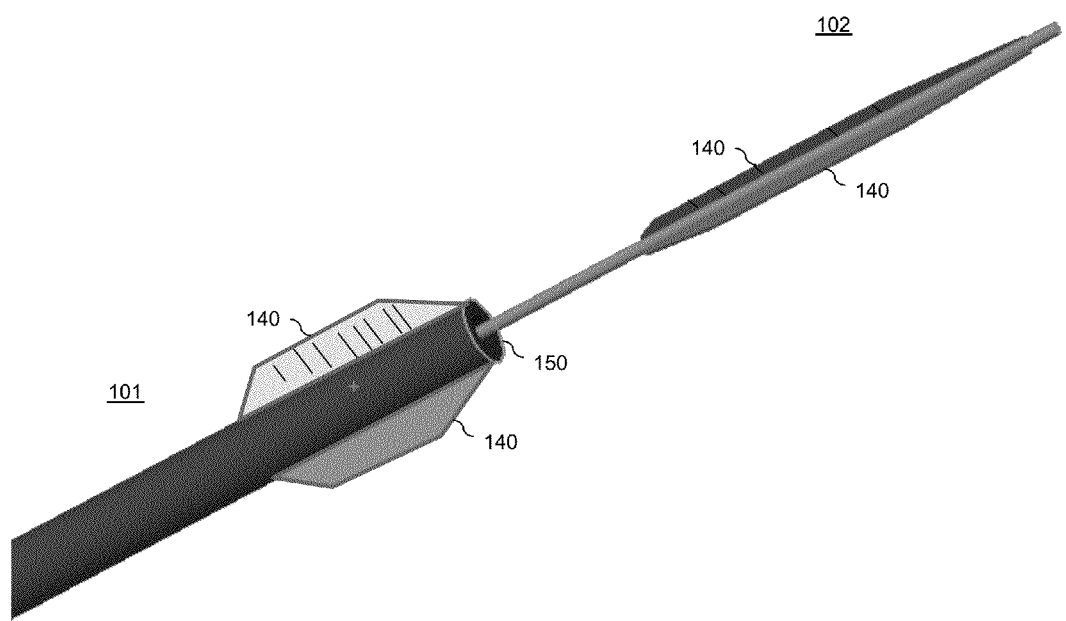
FIG. 4 illustrates the simulated medical instrument of FIG. 3A being inserted inside the simulated medical instrument of FIG. 1A.

FIG. 4 represents two simulated medical instruments 101 and 102, both having two tracking devices 140 forming a 180 degrees angle with one another. The simulated medical instrument 101 corresponds to the first embodiment represented in FIG. 1A, and has an inner longitudinal passage for inserting the simulated medical instrument 102. The simulated medical instrument 102 corresponds to the second embodiment represented in FIG. 3A, and has no inner longitudinal passage. For example, the tube 110 of the simulated medical instruments 102 simulates a guide wire, and the simulated medical instruments 101 is a catheter. The size and shape of the tracking devices 140 of the simulated medical instrument 102 may be adapted for allowing insertion of the simulated medical instrument 102 in the inner passage 150 of the simulated medical instrument 101. Alternatively, the tracking devices 140 of the simulated medical instrument 102 are made of a flexible material for allowing insertion of the simulated medical instrument 102 in the inner passage 150 of the simulated medical instrument 101. In still another alternative, the tracking devices 140 of the simulated medical instrument 102 are not adapted for allowing insertion of the simulated medical instrument 102 in the inner passage 150 of the simulated medical instrument 101; and the simulated medical instrument 102 must be inserted before (and extracted after) the simulated medical instrument 101 in the channel of the body cavity simulator. Although not represented in FIG. 4 for simplification purposes, the simulated medical instrument 101 may also be inserted in the inner longitudinal passage of a third simulated medical instrument (e.g. a cannula or another catheter having a larger diameter).

The tracking device(s) 140 of the simulated medical instrument 100 represented in FIGS. 1A-C, 3A-C and 4 (e.g. with tracking device(s) 140 in the form of flags, tags, barcodes, etc.) only allows static haptic interactions with the channel of the body cavity simulator, as will be detailed later in the description.

Reference is now made concurrently to FIGS. 5A, 5B, 5C, 6A, 6B, 6C, and 7, which represent a simulated medical instrument 200 for insertion in a channel of a body cavity simulator, according to a second aspect of the present disclosure. The simulated medical instrument 200 is similar to the aforementioned simulated medical instrument 100, except for its tracking device.

Figure 5A:
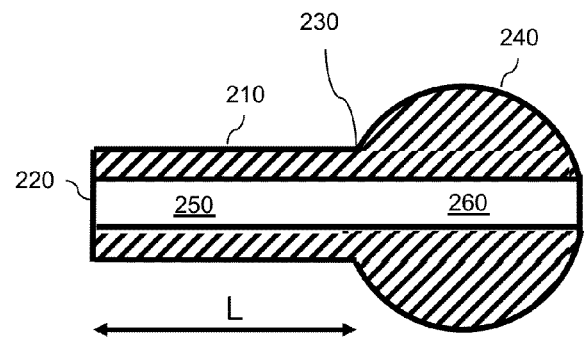
FIG. 5A illustrates a side cross-sectional view of a simulated medical instrument, according to a third embodiment.
Figure 5B:
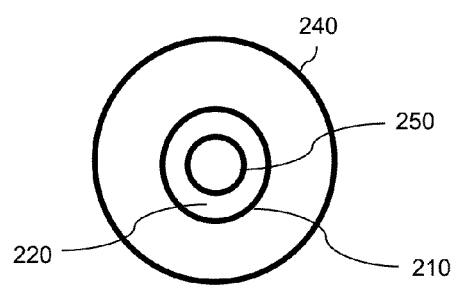
FIG. 5B illustrates a front view of the simulated medical instrument of FIG. 5A.
Figure 5C:
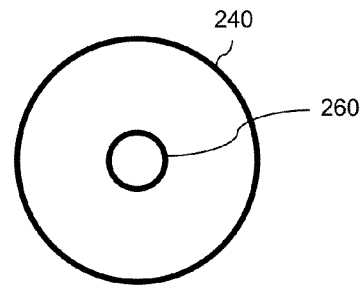
FIG. 5C illustrates a rear view of the simulated medical instrument of FIG. 5A.

FIGS. 5A, 5B and 5C represent a first embodiment of the simulated medical instrument 200, where FIG. 5A is a side cross-sectional view, FIG. 5B is a front view and FIG. 5C is a rear view.

The simulated medical instrument 200 comprises a tube 210. The tube 210 has a proximal end 220 and a distal end 230. The tune 210 is sized and shaped for insertion in a channel of a body cavity simulator. As illustrated in FIG. 5A, the tube 210 has a length L, and the distal end 230 is separated by the distance L from the proximal end 220. The characteristics of the tube 210 are similar to the characteristics of the tube 110 represented in FIG. 1A.

As mentioned previously with respect to the tube 110 illustrated in FIG. 1A, the length L of the tube 210 illustrated in FIG. 5A is not meant to be limitative in terms of a ratio between the length L of the tube 210 and the length l of the tracking device 240. The tube 210 has been represented with a relatively short length L for simplification purposes.

The simulated medical instrument 200 comprises a tracking device 240 positioned at the distal end 230 of the tube 210. The tracking device 240 of the simulated medical instrument 200 allows static haptic interactions with the channel of the body cavity simulator. However, the tracking device 240 is further adapted for receiving friction caused by a dynamic haptic mechanism positioned along at least a section of the channel of the body cavity simulator, as will be detailed later in the description.

Similarly to the tracking device 140 represented in FIG. 1A, the tracking device 240 has a pattern detectable via camera. The pattern may consist of a specific shape, a specific color pattern, a combination of a specific shape and a specific color pattern, etc.

The tracking device 240 may be a sphere, or another object allowing a dynamic haptic mechanism of the body cavity simulator to exert a friction against a surface of the tracking device 240. In a particular embodiment, a diameter of the tracking device 240 (e.g. a sphere) is substantially equal to a diameter of the tube 210. In another particular embodiment, a diameter of the tracking device 240 (e.g. a sphere) is substantially greater than a diameter of the tube 210, for increasing the friction exerted by the dynamic haptic mechanism of the body cavity simulator.

The tracking device 240 can be removably secured to the tube 210 (e.g. glued to the distal end 230 of the tube 210, etc.), or it can be integral to the tube 210.

FIGS. 5A, 5B and 5C represent a first embodiment of the simulated medical instrument 200, where the tube 210 comprises an inner longitudinal passage 250 extending between the proximal end 220 and the distal end 230, for receiving another simulated medical instrument in the inner longitudinal passage 250. The characteristics of the passage 250 are similar to the characteristics of the passage 150 represented in FIG. 1A. The tracking device 240 also comprises an inner longitudinal passage 260 for receiving the other simulated medical instrument in the inner longitudinal passage 260. The passage 250 of the tube 210 is aligned with the passage 260 of the tracking device 240. The characteristics of the passage 260 are generally similar to the characteristics of the passage 250, although the respective diameters and shapes of the passages 250 and 260 may be different, as long as they both allow insertion of the other simulated medical instrument. As mentioned previously, in this first embodiment, the simulated medical instrument 200 can simulate a cannula, a catheter, a catheter equipped with a balloon, etc.

The tube 210 may be at least partially made of a transparent, semi-transparent or translucent material for allowing detection by a camera of a pattern of a tracking device 240 of another simulated medical instrument 200 inserted inside the tube 210.

Figure 6A:
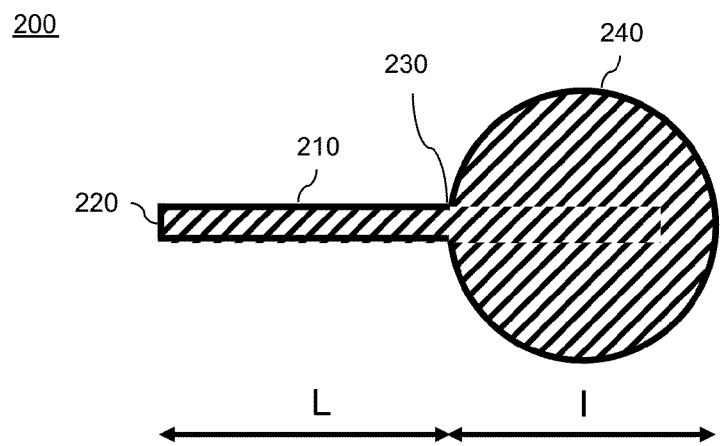
FIG. 6A illustrates a side cross-sectional view of a simulated medical instrument, according to a fourth embodiment.
Figure 6B:
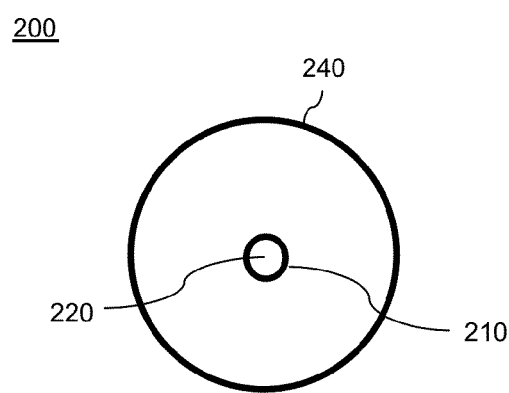
FIG. 6B illustrates a front view of the simulated medical instrument of FIG. 6A.
Figure 6C:
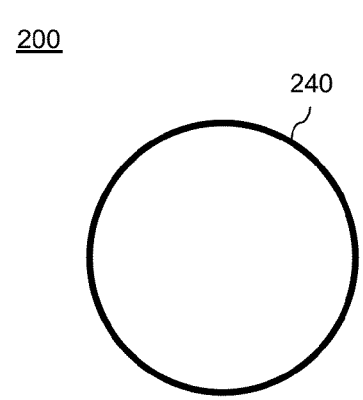
FIG. 6C illustrates a rear view of the simulated medical instrument of FIG. 6A.

FIGS. 6A, 6B and 6C represent a second embodiment of the simulated medical instrument 200, where FIG. 6A is a side cross-sectional view, FIG. 6B is a front view and FIG. 6C is a rear view.

This second embodiment is similar to the first embodiment represented in FIGS. 5A, 5B and 5C, except that the tube 210 is solid between the proximal end 220 and the distal end 230 (does not comprise an inner longitudinal passage). Consequently, it does not allow insertion of another simulated medical instrument in a passage. The tracking device 240 is also solid (does not comprise an inner longitudinal passage). As mentioned previously, in this second embodiment, the simulated medical instrument 200 can simulate a guiding wire, etc.

Figure 7:
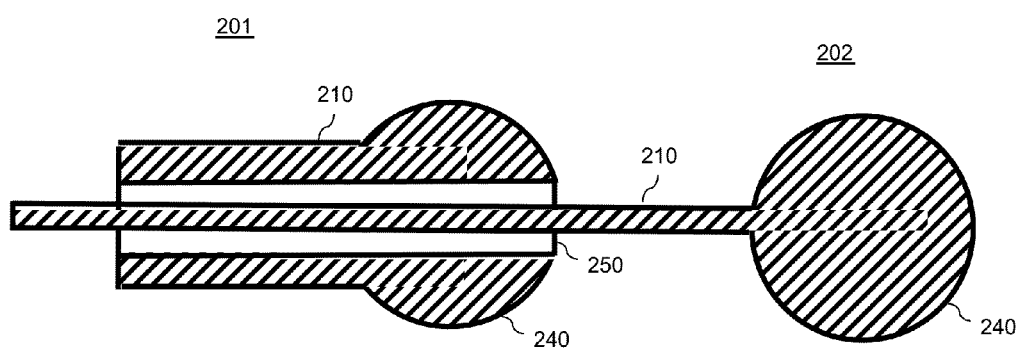
FIG. 7 illustrates the simulated medical instrument of FIG. 6A being inserted inside the simulated medical instrument of FIG. 5A.

FIG. 7 represents two simulated medical instruments 201 and 202, both having a tracking device 240 in the form of a sphere. The simulated medical instrument 201 corresponds to the first embodiment represented in FIG. 5A, and has two inner longitudinal passages respectively in its tube 210 and tracking device 240 for inserting the simulated medical instrument 202. The simulated medical instrument 202 corresponds to the second embodiment represented in FIG. 6A, and has no inner longitudinal passages. For example, the tube 210 of the simulated medical instruments 202 simulates a guide wire, and the simulated medical instruments 201 is a catheter. The diameter of the tracking device 240 of the simulated medical instrument 202 may be adapted for allowing insertion of the simulated medical instrument 202 in the inner passage 250 of the simulated medical instrument 201. Alternatively, the tracking device 240 of the simulated medical instrument 202 is made of a flexible material for allowing insertion of the simulated medical instrument 202 in the inner passage 250 of the simulated medical instrument 201. In still another alternative, the tracking device 240 of the simulated medical instrument 202 is not adapted for allowing insertion of the simulated medical instrument 202 in the inner passage 250 of the simulated medical instrument 201; and the simulated medical instrument 202 must be inserted before (and extracted after) the simulated medical instrument 201 in the channel of the body cavity simulator. Although not represented in FIG. 7 for simplification purposes, the simulated medical instrument 201 may also be inserted in the inner longitudinal passages of respectively the tube and tracking device of a third simulated medical instrument (e.g. a cannula or another catheter having a larger diameter).

Although not represented in the Figures, a simulated medical instrument 100 with a tracking device 140 in the form of a flag, tag, barcode, etc. (as illustrated in FIGS. 1A and 3A) may be inserted in a simulated medical instrument 200 with a tracking device 240 in the form of a sphere, etc. (as illustrated in FIG. 5A).

Reference is now made concurrently to FIGS. 8A, 8B, 8C and 9, which represent a system for simulating medical procedures, according to a third aspect of the present disclosure.

Figure 8A:
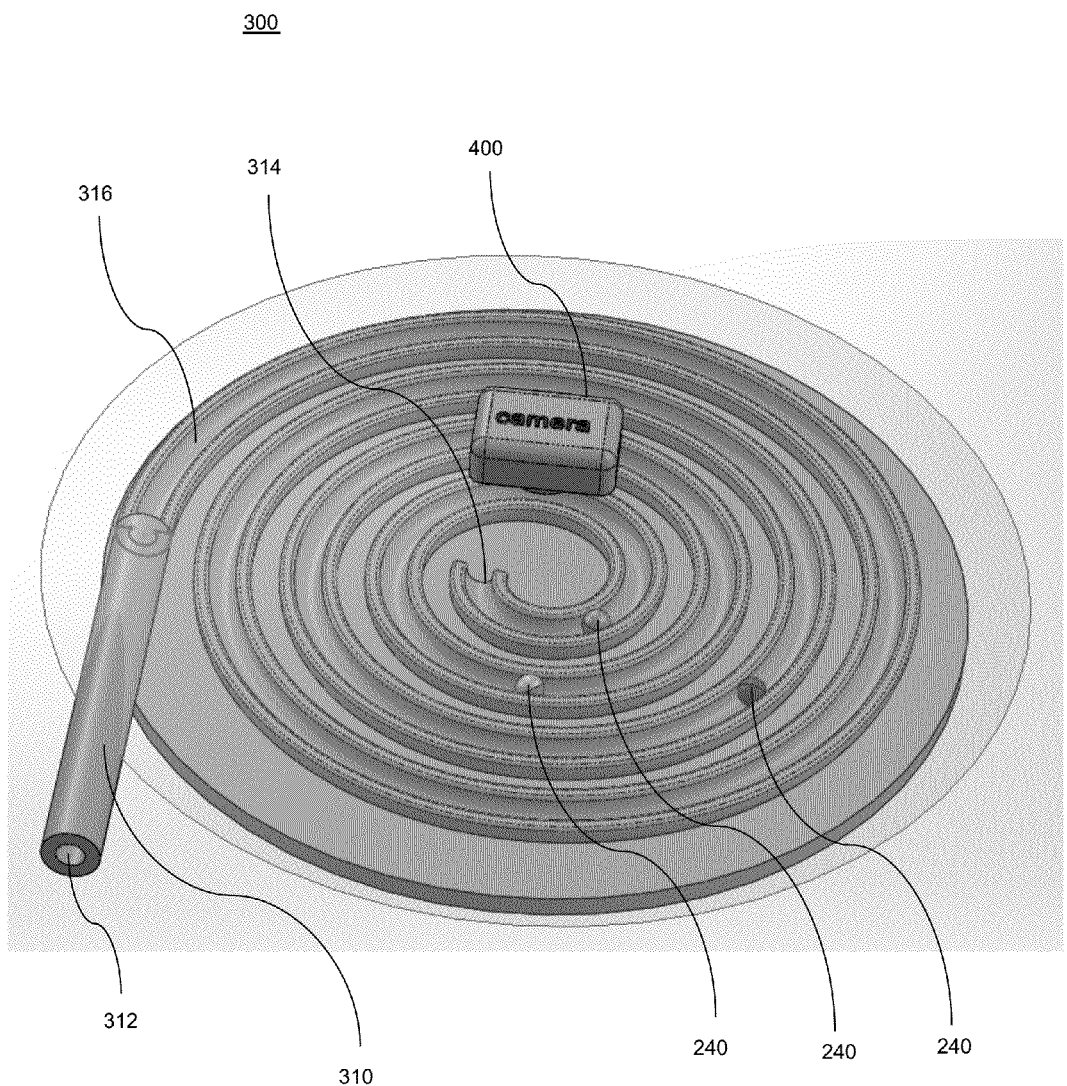
FIG. 8A illustrates a schematic cross-sectional perspective view of a body cavity simulator of a system for simulating medical procedures.
Figure 8B:
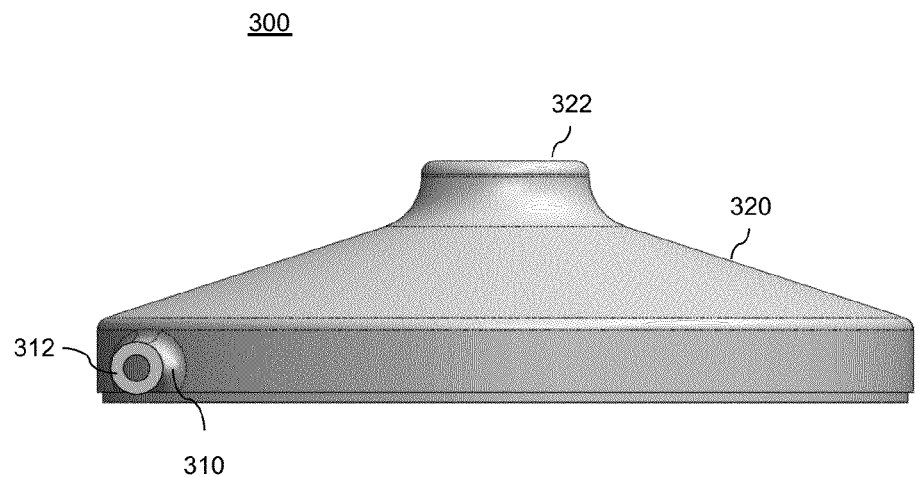
FIG. 8B illustrates a side view of the body cavity simulator of FIG. 8A.
Figure 8C:
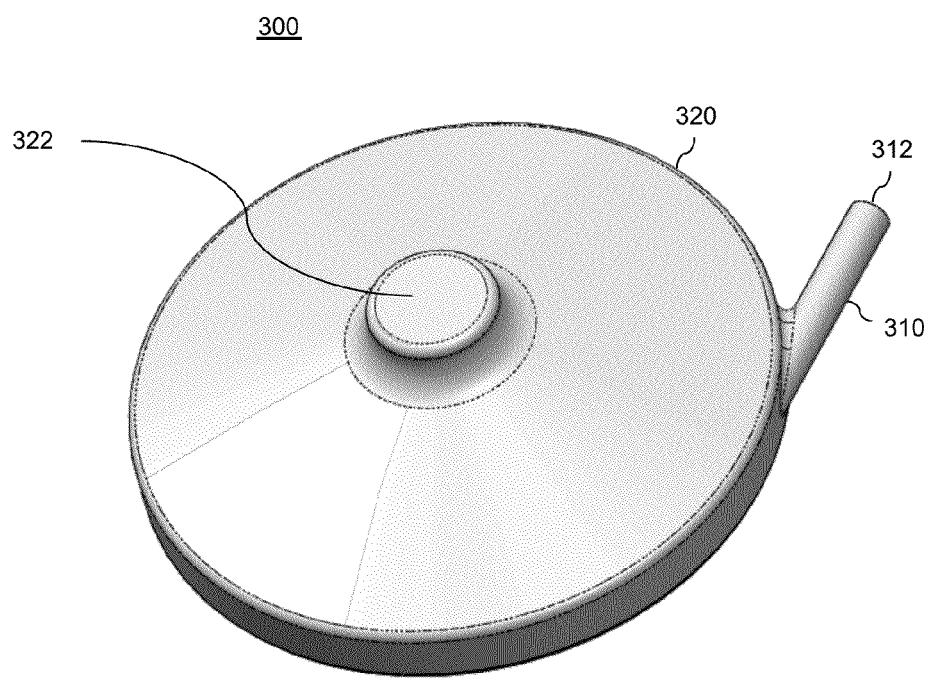
FIG. 8C illustrates a top view of the body cavity simulator of FIG. 8A.

FIGS. 8A, 8B and 8C represent a first embodiment of the system for simulating medical procedures, where FIG. 8A is a schematic cross-sectional perspective view, FIG. 8B is a side view and FIG. 8C is a top view.

The system for simulating medical procedures comprises a body cavity simulator 300. The body cavity simulator 300 comprises a channel 310. The channel 310 can be shaped like a vase to avoid dead points. In a particular embodiment, the channel 310 has any shape or path allowing easy insertion of the body cavity simulator 300 in a suitcase, and the body cavity simulator 300 is thus portable. The channel 310 has a proximal end 312, a distal end 314, and an inner longitudinal passage 316. The passage 316 extends between the proximal end 312 and the distal end 314. The channel 310 simulates a body channel, such as a trachea, an artery, a channel of the intestine such as the large intestine or the small intestine, etc. The channel 310 is adapted for receiving at least one of the aforementioned simulated medical instruments 100 (illustrated in FIG. 1A or 3A) or 200 (illustrated in FIG. 5A or 6A) through the proximal end 312. In addition to the channel 310, the body cavity simulator 300 may also include a simulator of a body part enclosing the channel 310. For instance, in the case of an artery, the body cavity simulator 300 only includes the channel 310 for simulating the artery, or includes a simulation of a body part such as an arm or a leg with the channel 310 enclosed in the simulated body part. Similarly, in the case of a large intestine, the body cavity simulator 300 only includes the channel 310 for simulating the large intestine, or includes a simulation of a body part such as a portion of the digestion system with the channel 310 enclosed in the simulated body part. Furthermore, the body cavity simulator 300 is generally adapted for simulating medical procedures on humans, but could also be adapted for simulating medical procedures on animals. Furthermore, the mechanism of the body cavity simulator 300 for receiving a simulated medical instrument is not limited to a channel 310, but may consist in any other mechanism allowing a realistic simulation of insertion of the simulated medical instrument in a simulated body cavity.

The passage 316 illustrated in FIG. 8A has a cylindrical shape (generally circular cross-section), but may have another shape (e.g. generally elliptical cross-section) based on the type of simulated body channel. Furthermore, the diameter of the passage 316 also varies based on the type of simulated body channel.

In the embodiment illustrated in FIG. 8A, the channel 310 is spirally wound and defines a circular body cavity simulator 300.

The body cavity simulator 300 may also include a frame 320 as illustrated in FIGS. 8B and 8C. The channel 310 is enclosed within the frame 320, except for its proximal end 312. The frame 320 can play several roles, such as protecting the channel 310, hiding a particular geometry of the channel 310, allowing attachment of the body cavity simulator 300 to another device via a dedicated attachment part 322 of the frame 320, etc. The shape and size of the frame 320 can vary significantly, as long as the channel 310 can be enclosed within the frame 320.

Figure 12:
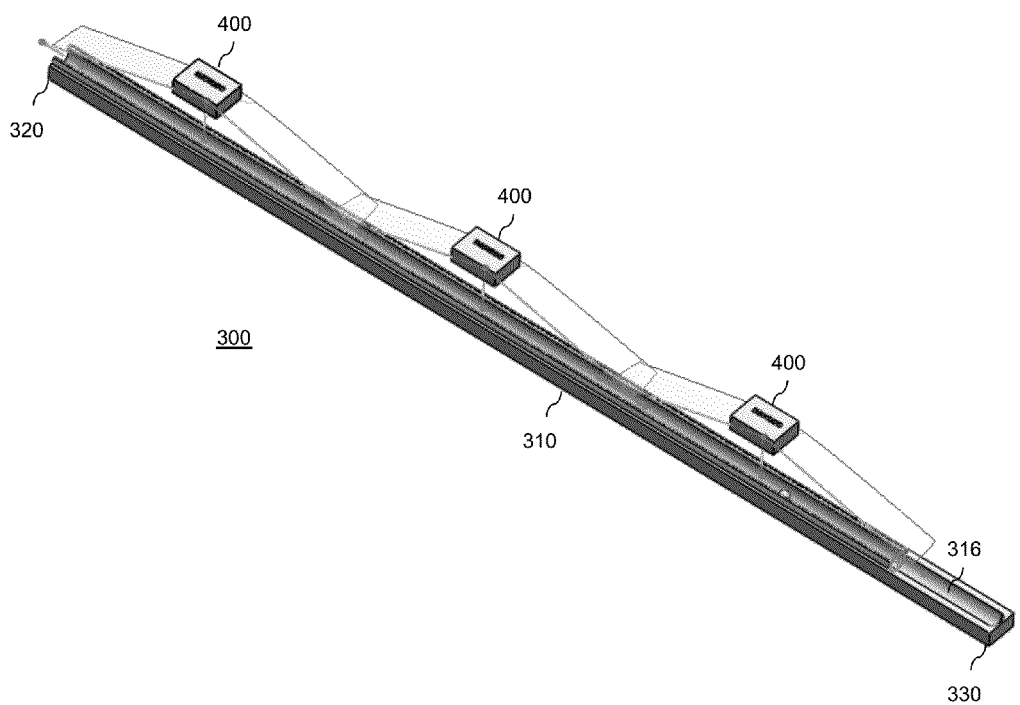
FIG. 12 illustrates a schematic cross-sectional perspective view of another embodiment of the body cavity simulator of FIG. 8A.

The system further comprises a camera 400 for capturing a pattern of a tracking device of the at least one simulated medical instrument inserted in the channel 310. For instance, the pattern of a tracking device 140 of the simulated medical instrument 100 illustrated in FIG. 1A or 3A; or the pattern of the tracking device 240 of the simulated medical instrument 200 illustrated in FIG. 5A or 6A. The camera 400 transmits data corresponding to the captured pattern of the tracking device to a processing unit 510 represented in FIG. 9, where the data are further processed. The further processing will be detailed later in the description. In a particular embodiment, the system comprises a plurality of cameras 400, as illustrated in FIG. 12.

FIG. 8A illustrates a system with a camera 400 centrally positioned with respect to the circular body cavity simulator 300. The camera 400 has an ultra wide angle, allowing capture of pattern(s) of any simulated medical instrument inserted in the channel 310. For example, the tracking devices 240 of three simulated medical instruments 200 (illustrated in FIG. 5A or 6A) have been represented in FIG. 8A. Only the three tracking devices 240 have been represented in FIG. 8A for simplification purposes, but all three simulated medical instruments have been inserted in the channel 310 via its proximal end 312. Each of the three simulated medical instruments extends up to its respective tracking device 240 within the passage 316 of the channel 310. The camera 400 is capable of capturing the patterns of the three tracking devices 240.

The channel 310 is partially made of a transparent, semi-transparent or translucent material for allowing the camera 400 to capture the pattern(s) through the channel 310. For example, if the camera 400 is positioned on top of the body cavity simulator 300 as illustrated in FIG. 8A, at least an upper section of the channel 310 is made of the transparent, semi-transparent or translucent material.

The upper section of the channel 310 can be made of a semi-transparent, translucent or any type of material that allows for the tracking devices to be viewed and captured by the camera.

In the embodiment illustrated in FIGS. 8A and 8B, the camera 400 is located within an upper section of the frame 320 on top of the body cavity simulator 300, and it is secured to the frame 320 by proper securing means.

Reference is now made concurrently to FIGS. 9, 10, 11A, 11B, 11C, 11D, 11E, 11F, which illustrate the processing by the processing unit 510 of the data captured by the camera 400.

The information captured by the camera 400 may comprise any surgical object used in the context of the medical simulation performed with the body cavity simulator 300. The captured information is not limited to the pattern(s) of the tracking device(s) of the simulated medical instrument(s) inserted in the body cavity simulator 300.

The processing unit 510 may be part of a control station 500. The processing unit 510 has one or more processors (not represented in FIG. 9 for simplification purposes) capable of executing instructions of computer program(s). Each processor may further have one or several cores. The control station 500 also comprises memory 520 for storing instructions of the computer program(s) executed by the processing unit 510, data generated by the execution of the computer program(s), data received via a communication interface 530 of the control station 500, etc. The control station 500 may comprise several types of memories, including volatile memory, non-volatile memory, etc. The control station 500 further comprises the communication interface 530 (e.g. Wi-Fi interface, Ethernet interface, cellular interface, etc.). The communication interface 530 is used for exchanging data with other entities, such as the camera 400 via communication links 450. Such communication links 450 may include wired (e.g. a fixed broadband network) and wireless communication links (e.g. a cellular network or a Wi-Fi network). The control station 500 may further comprise a display 540 (e.g. a regular screen or a tactile screen) for displaying data generated by the processing unit 510, and a user interface 550 (e.g. a mouse, a keyboard, a trackpad, a touchscreen, etc.) for allowing a user to interact with the control station 500. The control station 500 may consist of a computer, a laptop, a mobile device (e.g. smartphone, tablet, etc.), a dedicated control station for medical simulations, a dedicated control station for operational medical procedures, etc.

The camera 400 includes a communication interface supporting a communication protocol (e.g. USB, Wi-Fi, cellular, etc.) for transmitting data captured by the camera 400 to the processing unit 510 via the communication interface 530 through the communication links 450.

The processing unit 510 receives the data comprising the captured pattern(s) transmitted by the camera 400, and analyses the captured pattern(s). The analysis comprises determining at least one of the following: an identification of at least one simulated medical instrument inserted in the channel 310, a translation of the at least one simulated medical instrument inside the channel 310, and an orientation of the at least one simulated medical instrument inside the channel 310. The determination is based on the analysis of the captured pattern (s) for the at least one simulated medical instrument.

Figure 10:
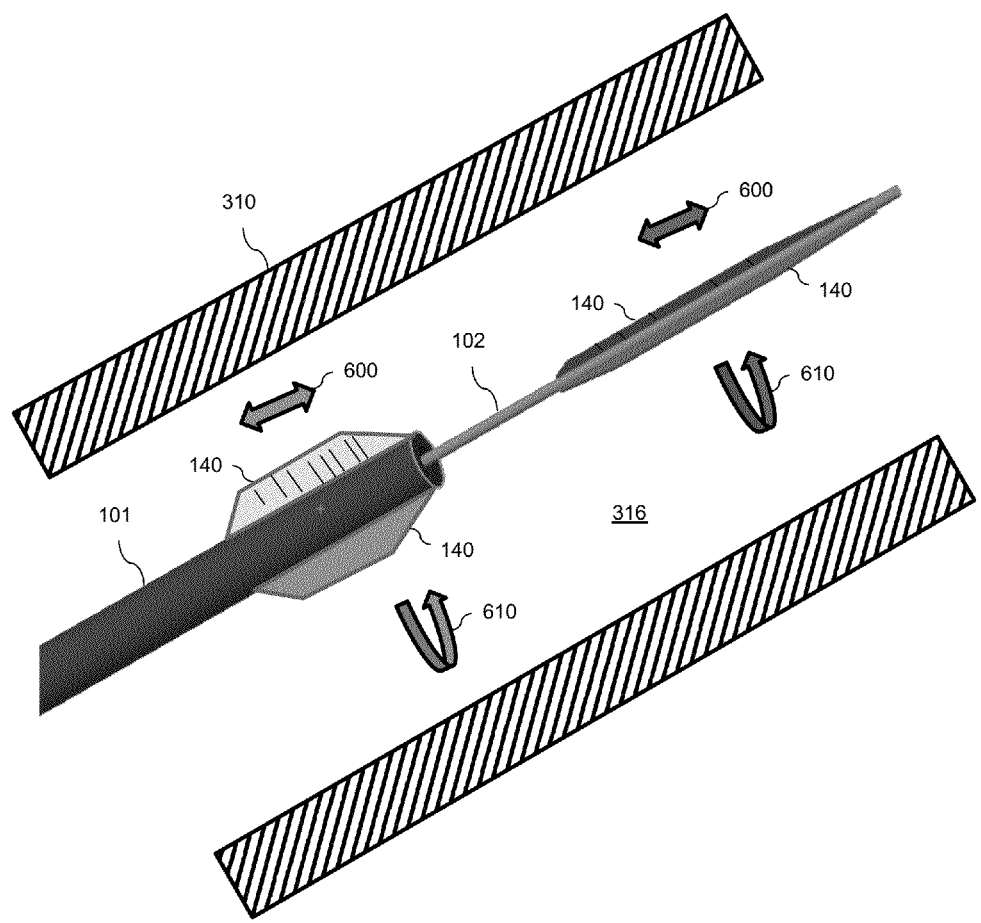
FIG. 10 illustrates an analysis performed by a processing unit of the control station of FIG. 9.

FIG. 10 illustrates the analysis performed by the processing unit 510 for the two simulated medical instruments 101 and 102 previously represented in FIG. 4, each having two tracking devices 140 forming a 180 degrees angle with one another. The two simulated medical instruments 101 and 102 are inserted inside the channel 310. Furthermore, the simulated medical instrument 101 (e.g. a cannula) corresponds to the embodiment represented in FIG. 1A, and has an inner longitudinal passage for inserting the simulated medical instrument 102 (e.g. a guide wire) corresponding to the embodiment represented in FIG. 3A. Each of the simulated medical instruments 101 and 102 perform a translation 600 within channel 310, and can also perform a rotation 610 around their longitudinal axis.

Each tracking device 140 is a flag having two opposite sides, each side having a unique color pattern. The unique color pattern may be simply a unique uniform color, or may be a unique combination of several colors (in order to be able to handle (with a limited number of colors) a plurality of simulated medical instruments respectively having a plurality of tracking devices). Thus, the aforementioned pattern of each tracking device 140 consists of the combination of the unique color pattern of each of its opposite sides.

At any time, the camera 400 is at least capable of capturing the unique color pattern of one side of one of the two flags 140 for each simulated medical instruments 101 and 102, based on their respective orientation with respect to the camera 400.

Based on the captured unique color pattern(s) for each simulated medical instruments 101 and 102, the processing unit 510 can identify the two simulated medical instruments 101 and 102 inserted in the channel 310.

Furthermore, the data captured by the camera 400 may comprise an image of the channel 310. Thus, by analyzing the captured unique color pattern(s) for each simulated medical instruments 101 and 102 with respect to the image of the channel 310, a position of each simulated medical instruments 101 and 102 within the channel 310 can be determined. Based on the particular geometry of the channel 310, a translation for each simulated medical instrument 101 and 102 can be further determined based on the determined position. The determined translation can for example indicate how far from the proximal end 312 of the channel 310 each simulated medical instrument 101 and 102 has been inserted.

Alternatively, the camera 400 can be configured during an initial phase to take a picture comprising the channel 310, this picture being correlated with the geometry of the channel 310. During the operational phase when the unique color pattern(s) are captured by the camera 400, by analyzing the position of the colors patterns within the image captured by the camera 400, the position of the color patterns within the channel 310 can be determined.

Additionally, by analyzing the captured color pattern for each simulated medical instruments 101 and 102, an orientation of each simulated medical instruments 101 and 102 within the channel 310 can be determined.

FIGS. 11A, 11B, 11C, 11D, 11E and 11F illustrate an example of determination of the orientation of the simulated medical instrument 102 represented in FIGS. 10 and 3B. The first flag 141 of the simulated medical instruments 102 has two patterns 650 and 651 on its respective opposite sides. The second flag 142 of the simulated medical instruments 102 has two patterns 652 and 653 on its respective opposite sides.

Figure 11A:
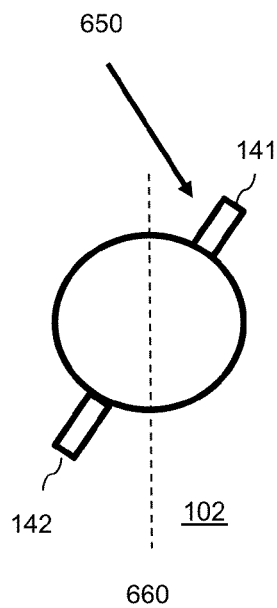
FIGS. 11A, 11B, 11C, 11D, 11E and 11F illustrate an exemplary determination of an orientation of a simulated medical instrument.

In the configuration represented in FIG. 11A, the pattern 650 is detected by the camera 400. Thus the flags 141 and 142 are substantially vertical, the flag 141 being on top and the flag 142 being below. Furthermore, the flag 141 is on the right with respect to a reference vertical axis 660, while the flag 142 is on the left with respect to the reference vertical axis 660.

Figure 11B:
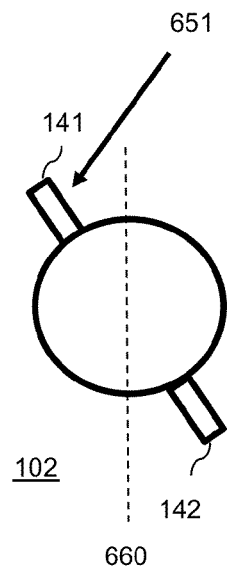

In the configuration represented in FIG. 11B, the pattern 651 is detected by the camera 400. Thus the flags 141 and 142 are substantially vertical, the flag 141 being on top and the flag 142 being below. Furthermore, the flag 141 is on the left with respect to the reference vertical axis 660, while the flag 142 is on the right with respect to the reference vertical axis 660.

Figure 11C:
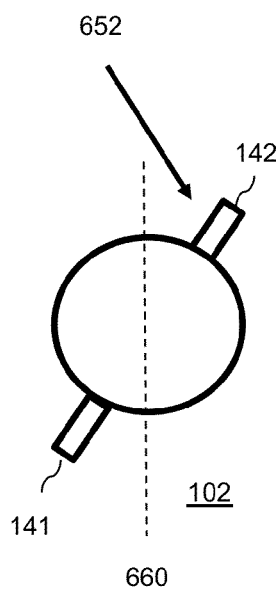

In the configuration represented in FIG. 11C, the pattern 652 is detected by the camera 400. Thus the flags 141 and 142 are substantially vertical, the flag 142 being on top and the flag 141 being below. Furthermore, the flag 142 is on the right with respect to the reference vertical axis 660, while the flag 141 is on the left with respect to the reference vertical axis 660.

Figure 11D:
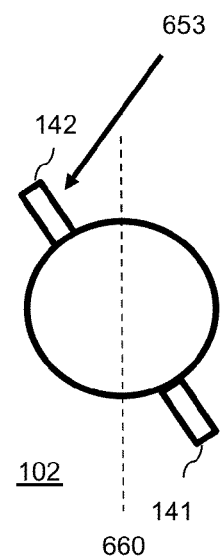

In the configuration represented in FIG. 11D, the pattern 653 is detected by the camera 400. Thus the flags 141 and 142 are substantially vertical, the flag 142 being on top and the flag 141 being below. Furthermore, the flag 142 is on the left with respect to the reference vertical axis 660, while the flag 141 is on the right with respect to the reference vertical axis 660.

Figure 11E:
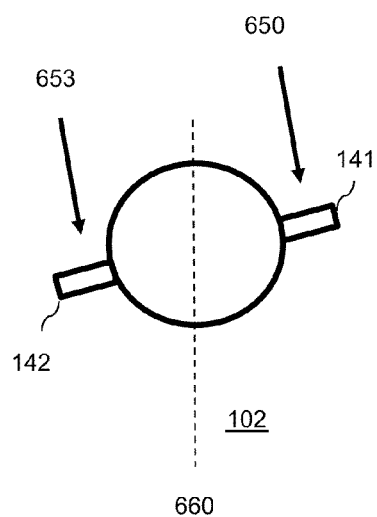

In the configuration represented in FIG. 11E, the patterns 650 and 653 are detected by the camera 400. Thus the flags 141 and 142 are substantially horizontal. Furthermore, the flag 141 is on the right with respect to the reference vertical axis 660, while the flag 142 is on the left with respect to the reference vertical axis 660.

Figure 11F:
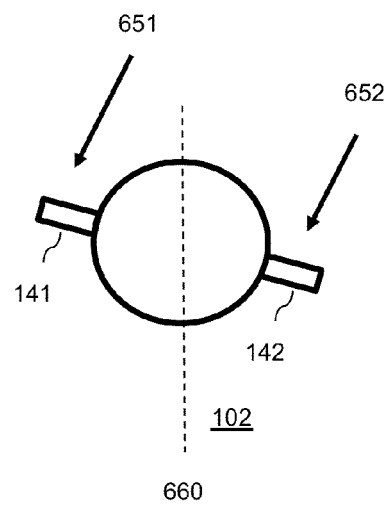

In the configuration represented in FIG. 11F, the patterns 651 and 652 are detected by the camera 400. Thus the flags 141 and 142 are substantially horizontal. Furthermore, the flag 142 is on the right with respect to the reference vertical axis 660, while the flag 141 is on the left with respect to the reference vertical axis 660.

Although the determination by the processing unit 510 of the identification, translation and orientation of simulated medical instrument(s) inserted inside the channel 310 has been illustrated in FIG. 10 for two simulated medical instruments 101 and 102, it can be generalized for one, two, three or more simulated medical instruments simultaneously inserted inside the channel 310. Furthermore, as mentioned previously, the patterns used for determining the identification, translation and orientation of the simulated medical instrument(s) are not limited to specific color patterns, but may also include specific shapes, or a combination of specific color patterns and specific shapes, as long as they can be detected by the camera 400. Furthermore, the two simulated medical instruments 101 and 102 represented in FIG. 10 respectively correspond to the embodiments represented in FIG. 1A and FIG. 3A, with two tracking devices 140. However, the determination of the identification, translation and orientation can be generalized for simulated medical instruments 100 having one, two, three, four or more tracking devices 140. In particular, a larger number of tracking devices 140 on the simulated medical instruments 100 improves the accuracy of the determination of the orientation. The determination of the identification, translation and orientation can also be generalized for simulated medical instruments 200 corresponding to the embodiments represented in FIG. 5A and FIG. 6A. For example, the tracking device 240 of a simulated medical instrument 200 can be a sphere having an external surface covered with a unique color pattern detectable by the camera 400, the unique color pattern allowing a determination of the orientation of the sphere.

FIG. 12 represents a second embodiment of the system for simulating medical procedures, FIG. 12 being a schematic cross-sectional perspective view.

Figure 9:
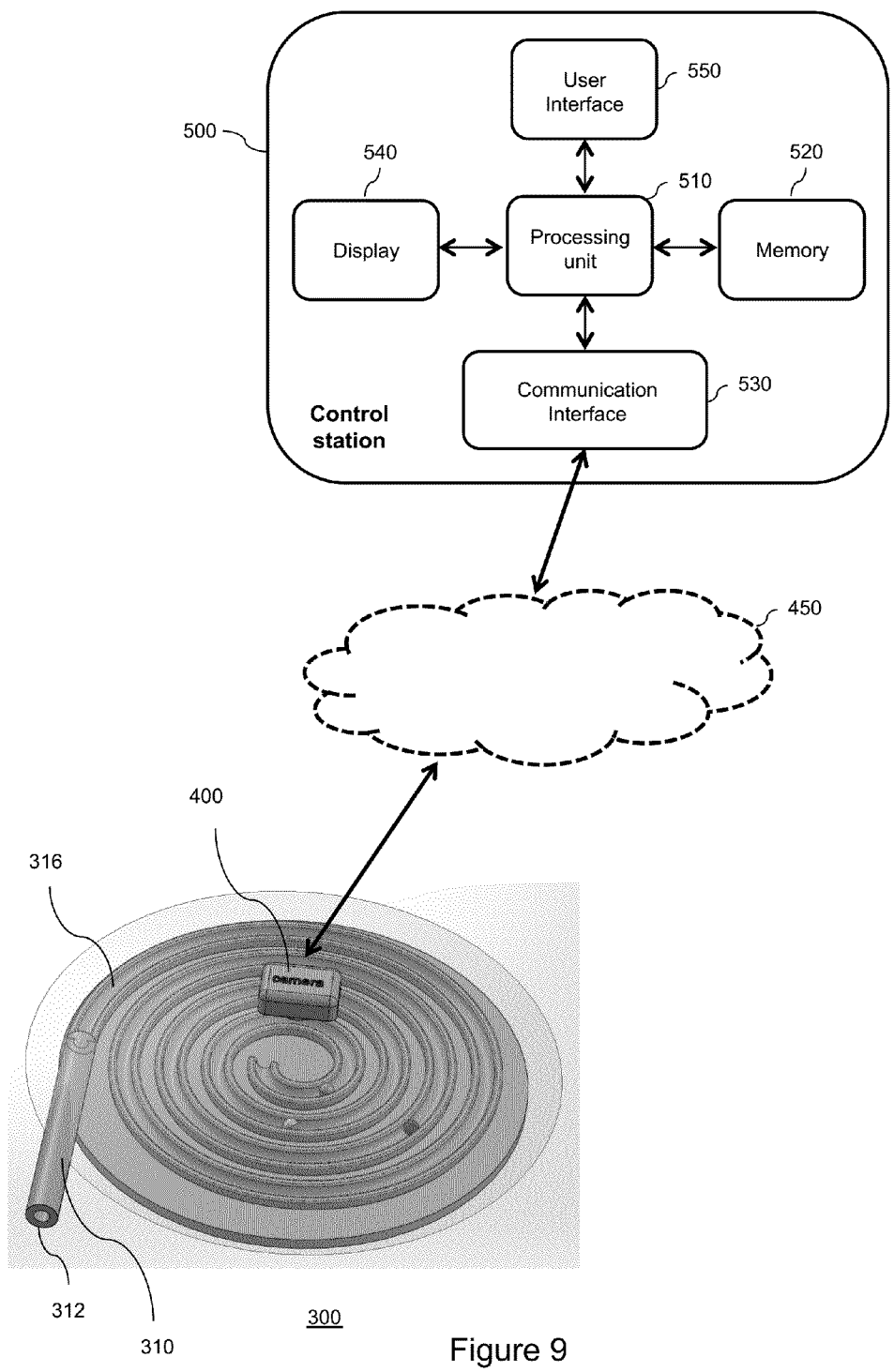
FIG. 9 illustrates the system for simulating medical procedures of FIG. 8A comprising a control station.

This second embodiment is similar to the first embodiment represented in FIGS. 8A and 9, except that the channel 310 is linear and defines a linear body cavity simulator 300. Furthermore, the system may comprise a plurality of cameras 400 for covering the entire length of the channel 310. The system represented in FIG. 12 comprises three cameras 400 for illustration purposes, but may comprise more or less cameras 400. The number of cameras 400 is adapted for covering the entire length of the channel 310, and depends on the extent of the area which can be covered by a single camera 400. The data captured by each camera 400 are combined by the processing unit 510 represented in FIG. 9, for the determination of the identification, translation and orientation of simulated medical instrument(s) inserted inside the channel 310.

The system may comprise a frame (not represented in FIG. 12) for enclosing and supporting the linear body cavity simulator 300 and the camera(s) 400. Alternatively, the system does not comprise a frame, and the linear body cavity simulator 300 and the camera(s) 400 are independently affixed to a supporting entity.

Figure 13A:
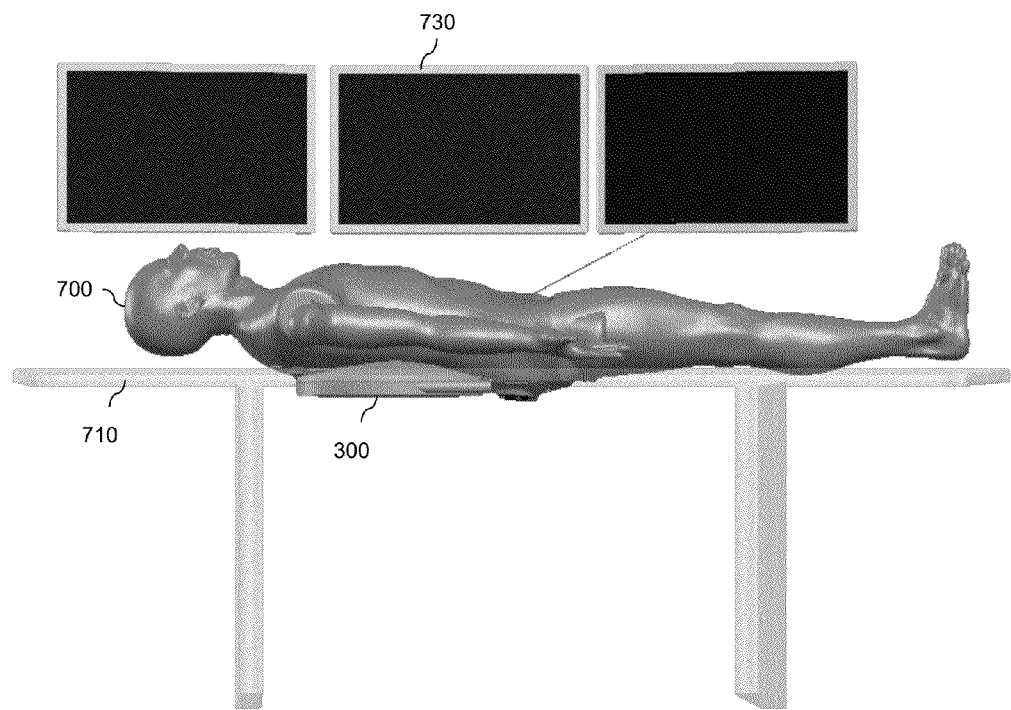
FIGS. 13A and 13B illustrate the integration of the body cavity simulator of FIG. 8A with a simulation mannequin.
Figure 13B:
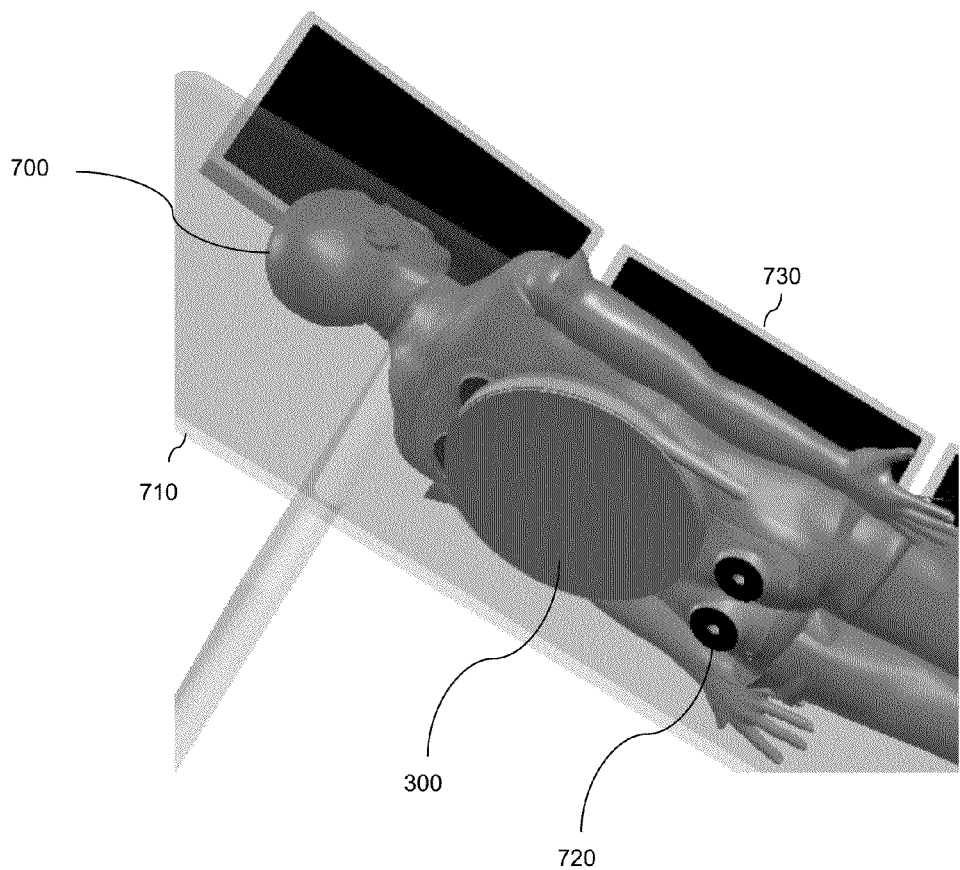
Figure 13C:
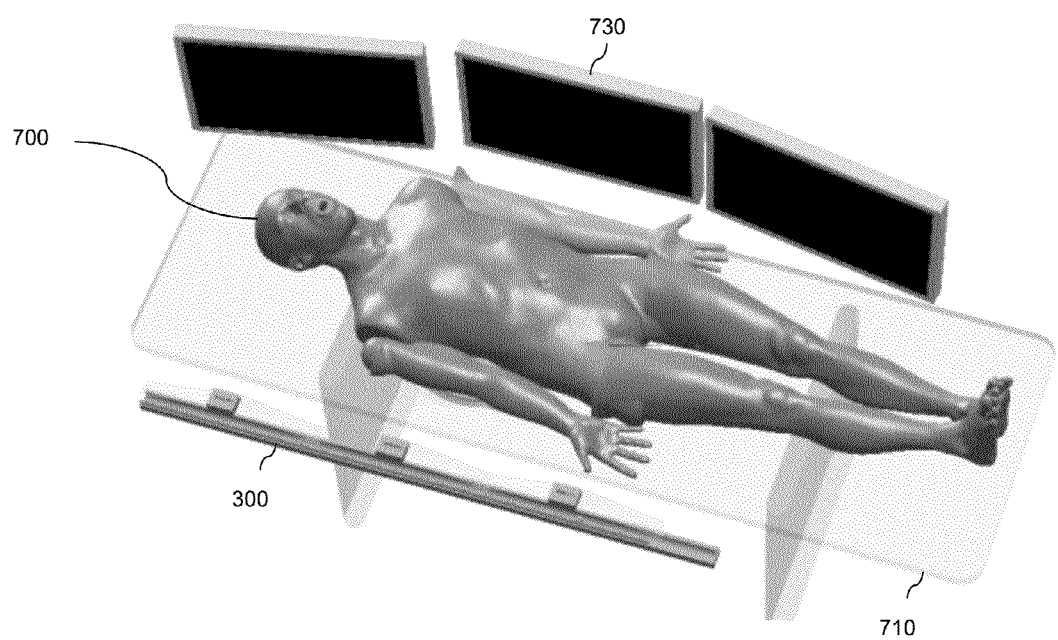
FIG. 13C illustrates the integration of the body cavity simulator of FIG. 12 with a simulation mannequin.

Reference is now made concurrently to FIGS. 9, 13A, 13B and 13C, where FIGS. 13A, 13B and 13C illustrate the integration of the body cavity simulator 300 with a simulation mannequin 700.

The simulation mannequin 700 is a realistic representation of a human body and is positioned on a table 710. The body cavity simulator 300 represented in FIGS. 13A and 13B corresponds to the embodiment represented in FIG. 8B of a circular body cavity simulator 300 with a spirally wounded channel 310.

The simulation mannequin 700 comprises a plurality of securing mechanisms 720 (projecting downwardly through a horizontal surface of the table 710), for securing the body cavity simulator 300 thereto (e.g. via the dedicated attachment part 322 represented in FIG. 8C). A particular securing mechanism 720 is selected among the plurality of securing mechanisms 720 for attaching the body cavity simulator 300, so that the body cavity simulated with the body cavity simulator 300 is positioned substantially below its counterpart in the simulation mannequin 700.

In FIGS. 13A and 13B, the body cavity 300 is located below the surface of the table 710. In an alternative embodiment, the body cavity simulator 300 is located above the surface of the table 710, and positioned below the mannequin 700 or besides the mannequin 700. The body cavity simulator 300 can also be located inside the table 710.

Alternatively, the body cavity simulator 300 may be integrated into the simulation mannequin 700, and positioned within the simulation mannequin 700 at a position corresponding to the simulated body cavity, with the proximal end 312 (represented in FIG. 8A) projecting away from a surface of the simulation mannequin 700. In another alternative, a patient may be positioned on the table 710 in place of the simulation mannequin 700.

The use of a simulation mannequin 700 or a patient in combination with the body cavity simulator 300 allows a trainee (or an experimented professional) to simulate and practice an operation involving insertion of medical instruments inside a body channel (e.g. a trachea, an artery, a channel of the intestine such as the large intestine or the small intestine, etc.) in a more realistic manner, compared to the use of the body cavity simulator 300 alone.

The body cavity simulator 300 represented in FIG. 13C corresponds to the embodiment represented in FIG. 12 of a linear body cavity simulator 300 with a linear channel 310. The body cavity simulator 300 is substantially aligned with a simulation mannequin 700 or a patient, for instance to simulate an artery of an arm.

In the case of a patient being positioned on the table 710, a medical imaging system (not represented in FIGS. 13A, 13B and 13C) may take (2D or 3D) images of the body cavity of the patient simulated by the body cavity simulator 300. As mentioned previously, the processing unit 510 represented in FIG. 9 determines (based on the data captured and transmitted by the camera 400) the following: an identification of at least one simulated medical instrument inserted the channel 310 of the body cavity simulator 300, the translation of the at least one simulated medical instrument inside the channel 310, and the orientation of the at least one simulated medical instrument inside the channel 310. The determined identification, translation and orientation can be combined with the images taken by the medical imaging system. The combination is performed by the processing unit 510 (or another processing unit of another computing device). The combination is further displayed on a screen 730 for showing a progression of the at least one simulated medical instrument inside the simulated body cavity.

The simulated medical instrument 100 represented in FIGS. 1A-C, 3A-C and 4 (e.g. with tracking devices 140 in the form of flags) only allows static haptic interactions with the channel 310 of the body cavity simulator 300 represented in FIG. 8A or 12. The static haptic interactions consist of frictions of the flags 140 against the internal surface of the channel 310 defining the inner longitudinal passage 316. The static haptic friction increases with a deeper penetration of the simulated medical instrument 100 inside the inner longitudinal passage 316 of the channel 310. Furthermore, the circular body cavity simulator 300 represented in FIG. 8A offers more friction than the linear body cavity simulator 300 represented in FIG. 12.

The simulated medical instrument 200 represented in FIGS. 5A-C, 6A-C and 7 (e.g. with a tracking device 140 in the form of a sphere) also allows dynamic haptic interactions with the channel 310 of the body cavity simulator 300 represented in FIG. 8A or 12, when the body cavity simulator 300 is adapted for this purpose, as detailed in the following.

Figure 14A:
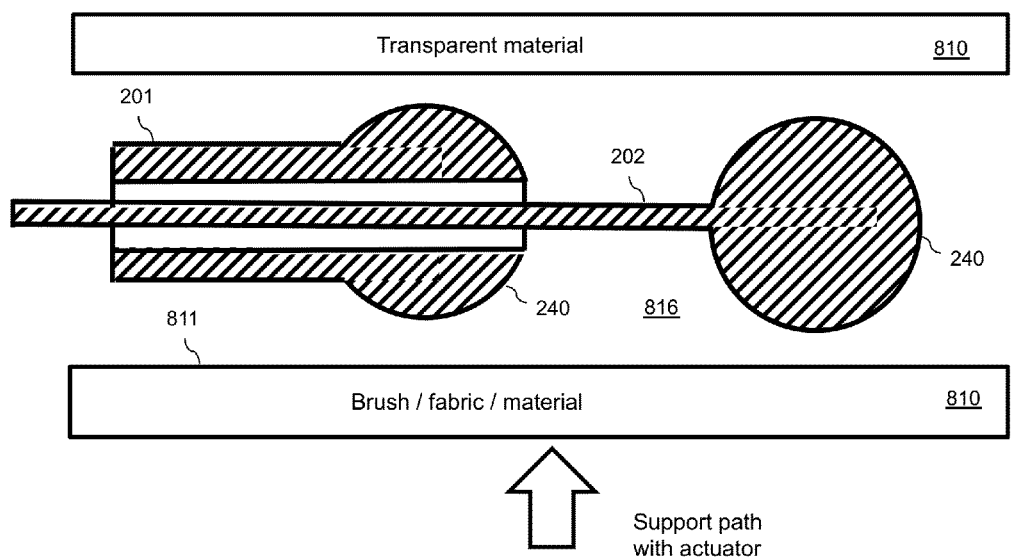
FIGS. 14A, 14B and 14C illustrate a body cavity simulator adapted for providing dynamic haptic interactions.
Figure 14B:
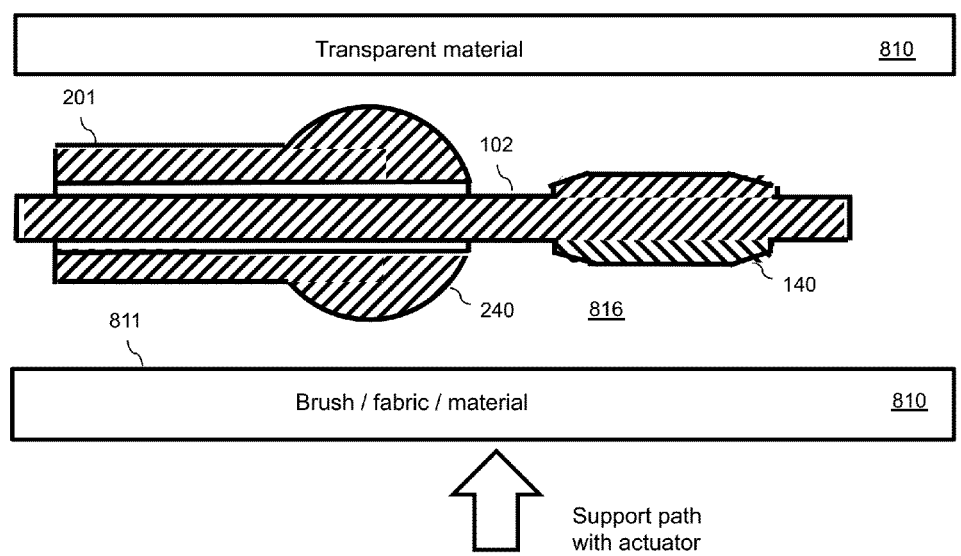
Figure 14C:
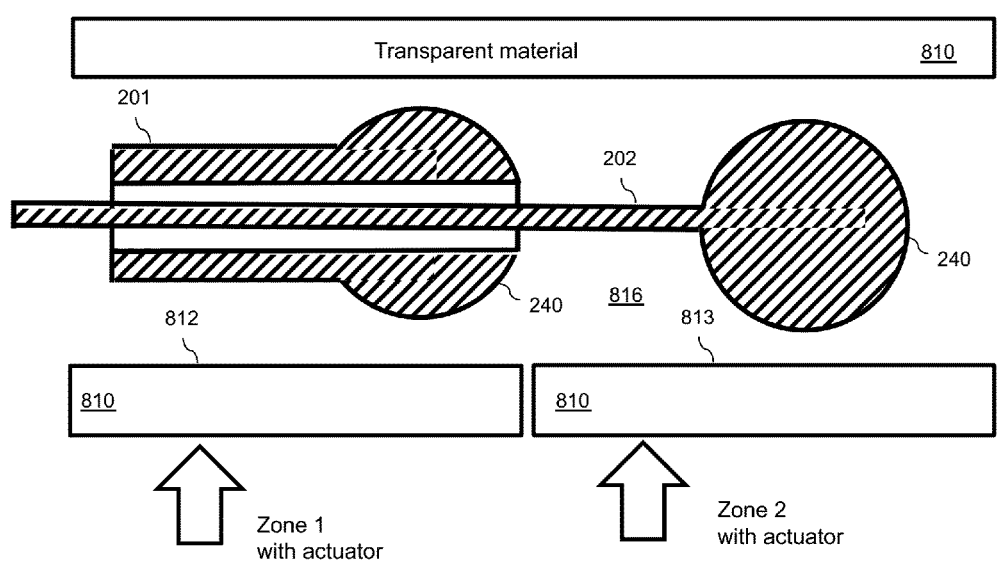

Reference is now made concurrently to FIGS. 14A, 14B and 14C, which represent a body cavity simulator 800 adapted for providing dynamic haptic interactions, according to a fourth aspect of the present disclosure.

The body cavity simulator 800 is similar to the body cavity simulators 300 represented in FIG. 8A or 12, except for the channel 810. This new design can be applied to both a circular body cavity simulator as illustrated in FIG. 8A and to a linear circular body cavity simulator as represented in FIG. 12.

For illustration purposes, FIGS. 14A and 14C represent two simulated medical instruments 201 and 202 (corresponding to those represented in FIG. 7), both having a tracking device 240 in the form of a sphere, being inserted inside the inner longitudinal passage 816 of the channel 810. The tracking devices 240 of simulated medical instruments 201 and 202 are both rigid for allowing haptic interactions with the body cavity simulator 800. The simulated medical instrument 202 has been inserted before the simulated medical instruments 201. Furthermore, the diameters of the tracking devices 240 of simulated medical instruments 201 and 202 are substantially the same for allowing simultaneous haptic interactions with both simulated medical instruments. In an alternative not represented in the Figures, a single simulated medical instrument 201 with a rigid tracking device 240 in the form of a sphere can be inserted for allowing haptic interactions with the body cavity simulator 800. In still another alternative represented in FIG. 14B, a first simulated medical instrument 201 with a rigid tracking device 240 in the form of a sphere can be inserted for allowing haptic interactions with the body cavity simulator 800. A second simulated medical instrument 102 (corresponding to the embodiment represented in FIG. 3A) with a tracking device 140 in the form of a flag, tag, barcode, etc. is also inserted, but does not allow haptic interactions with the body cavity simulator 800. However, the second simulated medical instrument 102 can be easily inserted/removed through the first simulated medical instrument 201. In yet another alternative, a simulated medical instrument simulating a catheter equipped with a balloon can be inserted in the body cavity simulator 800, and provides haptic interactions with the balloon. There is no limitations on the simulated medical instrument inserted in the body cavity simulator 800, as long as it includes a component providing haptic interactions.

As previously mentioned, at least the upper section of the channel 810 is made of a transparent, semi-transparent or translucent material for allowing detection by a camera of the patterns of the tracking devices 240 of the simulated medical instruments 201 and 202.

A dynamic haptic mechanism is used for exerting a pressure causing a friction against the tracking devices 240 of the simulated medical instruments 201 and 202. For example, as illustrated in FIG. 14A, an actuator pushes the interior wall 811 of the entire lower section of the channel 810 towards the simulated medical instruments 201 and 202. Alternatively, a bladder or any device capable of exerting a pressure by pushing the interior wall 811 can be used. When the interior wall 811 reaches the tracking devices 240, it exerts a pressure causing a friction against these tracking devices 240. In another embodiment illustrated in FIG. 14C, a plurality of devices capable of exerting a pressure (e.g. actuators, bladders, etc.) can be activated independently for pushing the interior wall (812 or 813) of a specific zone of the lower section of the channel 810 towards at least one simulated medical instrument. For instance, actuation of zone 1 pushes the corresponding interior wall 812 towards the simulated medical instruments 201 for exerting a pressure causing a friction against the tracking device 240 of the simulated medical instruments 201. Similarly, actuation of zone 2 pushes the corresponding interior wall 813 towards the simulated medical instruments 202 for exerting a pressure causing a friction against the tracking device 240 of the simulated medical instruments 202.

The interior walls 811, 812 and 813 for exerting a pressure causing a friction against the tracking devices may consist of a brush, a bladder, a fabric, a material, etc. The interior walls 811, 812 and 813 can be made in silicone, plastic, etc. They can also be covered by an abrasive paint that causes friction. The resulting friction is a combination of the material/geometry of the tracking device and the surface finish/material of the interior walls.

The dynamic haptic mechanism may be activated manually by a user of the body cavity simulator 800. Alternatively, the dynamic haptic mechanism is automatically activated when the presence of a particular simulated medical instrument detected. The automatic activation may also depend on the position and/or orientation of the simulated medical instrument in the channel 810 of the body cavity simulator 800. For example, the processing unit 510 represented in FIG. 9 controls the dynamic activation of the dynamic haptic mechanism, based on the determination of the identification, translation and orientation of the simulated medical instrument.

The friction generated by the dynamic haptic mechanism simulates the friction experienced when a real medical instrument (e.g. a catheter) hits an interior wall of a real body channel.

According to another embodiment, the channel 810 of the body cavity simulator 800 also includes at least one pressure sensor (not represented in the Figures), for measuring a pressure exerted by a tracking device 240 against the interior walls of the channel 810.

According to still another embodiment, the body cavity simulator 800 is configurable. For example, actuators are used for dynamically modifying the diameter of a particular section of the channel 810, for dynamically modifying the shape of a particular section of the channel 810, for dynamically modifying the orientation of a particular section of the channel 810, etc. The body cavity simulator 800 can also be provided with opening doors. The opening doors are controlled by a software, which is configured to take into account different possible channel 810 in the body cavity simulator 800. A particular software configuration provides a small, medium or long channel 810, depending on a particular medical procedure to be simulated. The body cavity simulator 800 can be seen as a configurable labyrinth providing a variety of paths based on its configuration.

Figure 15:
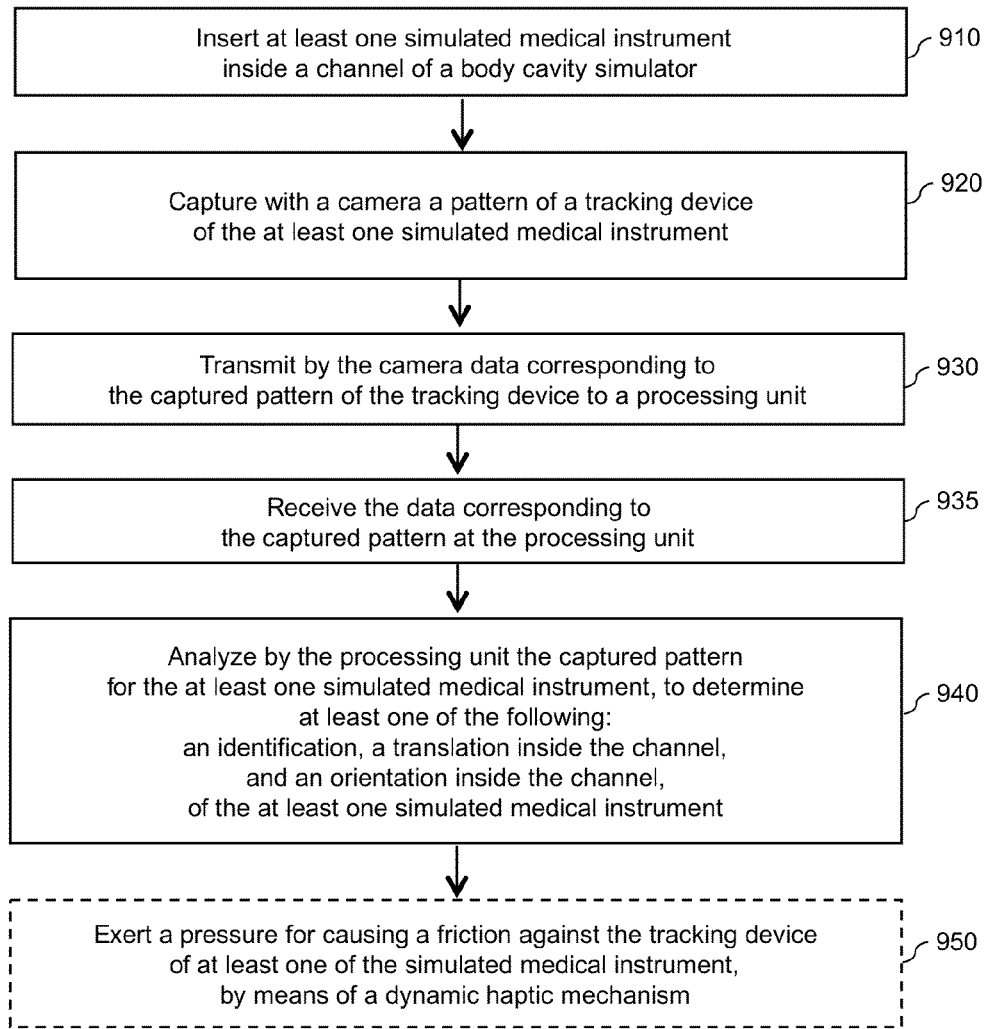
FIG. 15 illustrates a method for simulating medical procedures.

Reference is now made to FIG. 15, which represents a method 900 for simulating medical procedures, according to a fifth aspect of the present disclosure.

The method 900 comprises the step 910 of inserting at least one simulated medical instrument inside a channel of a body cavity simulator.

The method 900 comprises the step 920 of capturing with a camera a pattern of a tracking device of the at least one simulated medical instrument inserted inside the channel of the body cavity simulator.

The method 900 comprises the step 930 of transmitting by the camera data corresponding to the captured pattern of the tracking device to a processing unit.

The method 900 comprises the step 935 of receiving the data corresponding to the captured pattern at the processing unit.

The method 900 comprises the step 940 of analyzing by the processing unit the captured pattern for the at least one simulated medical instrument, to determine at least one of the following: an identification of the at least one simulated medical instrument, a translation of the at least one simulated medical instrument inside the channel of the body cavity simulator, and an orientation of the at least one simulated medical instrument inside the channel of the body cavity simulator.

In a particular aspect, the method 900 further comprises the step 950 of exerting a pressure for causing a friction against the tracking device of at least one of the simulated medical instrument inserted inside the channel of the body cavity simulator, by means of a dynamic haptic mechanism. As mentioned previously, step 950 can only be performed for a simulated medical instrument having a tracking device (e.g. a sphere, but not a flag, a tag, etc.) adapted for supporting the pressure/friction exerted by the dynamic haptic mechanism. Step 950 can be performed concurrently with steps 920, 930 and 940.

A simulated medical instrument with a tracking device which does not provide dynamic haptic interactions (e.g. a flag, a tag, a line, a barcode, etc.) is generally used for the entry procedure in a channel of a body cavity simulator. A simulated medical instrument with a tracking device providing dynamic haptic interactions (e.g. a sphere, etc.) is generally used thereafter for monitoring the progression towards the distal end of the channel.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A simulated medical instrument for insertion in a channel of a body cavity simulator, comprising:
    a tube comprising a proximal end and a distal end, the tube being sized and shaped for insertion in the channel of the body cavity simulator, the distal end being inserted into the channel of the body cavity simulator while the proximal end being outside the channel of the body cavity simulator; and
    at least one tracking device located in proximity of the distal end of the tube, the tracking device including a corresponding pattern specific to the tracking device and detectable via camera when the tracking device is inserted into the channel of the body cavity simulator.

2. The simulated medical instrument of claim 1, wherein the pattern of the tracking device comprises one of the following: a specific shape, a specific color pattern, and a combination thereof.

3. The simulated medical instrument of claim 1, wherein the tracking device projects radially away from the tube along an external surface of the tube.

4. The simulated medical instrument of claim 3, wherein the tracking device is a flag.

5. The simulated medical instrument of claim 1, wherein the tracking device is a marking on the tube.

6. The simulated medical instrument of claim 5, wherein the tracking device consists of one of the following: a tag, a line, and a barcode.

7. The simulated medical instrument of claim 1, wherein the tracking device is removably secured to the tube.

8. The simulated medical instrument of claim 1, wherein the tracking device is integral to the tube.

9. The simulated medical instrument of claim 1, wherein the tube comprises an inner longitudinal passage extending between the proximal end and the distal end for receiving another simulated medical instrument inside the inner longitudinal passage.

10. The simulated medical instrument of claim 9, wherein the tube is at least partially made of a transparent, semi-transparent or translucent material for allowing detection via the camera of a specific pattern of a tracking device of the other simulated medical instrument inserted inside the tube.

11. The simulated medical instrument of claim 9, simulating one of the following: a cannula, a catheter, and a catheter equipped with a balloon.

12. The simulated medical instrument of claim 1, wherein the tube does not comprise an inner longitudinal passage extending between the proximal end and the distal end.

13. The simulated medical instrument of claim 12, wherein the tube simulates a guide wire.

14. The simulated medical instrument of claim 1, wherein the tube is made of a flexible material.

15. The simulated medical instrument of claim 1, wherein the tracking device is adapted for allowing insertion of the simulated medical instrument in an inner longitudinal passage of another simulated medical instrument.

16. The simulated medical instrument of claim 15, wherein the tracking device is made of a flexible material.

\* \* \* \* \*